Aug. 26, 1947.  G. M. MacDONALD  2,426,362
SLIDE RULE CALCULATOR
Filed Oct. 16, 1944  8 Sheets-Sheet 1

Inventor
George M. MacDonald
by Babcock & Babcock
Attorneys

Aug. 26, 1947. G. M. MacDONALD 2,426,362
SLIDE RULE CALCULATOR
Filed Oct. 16, 1944 8 Sheets-Sheet 2

Inventor
George M. MacDonald
By Babcock & Babcock
Attorneys

Aug. 26, 1947.    G. M. MacDONALD    2,426,362
SLIDE RULE CALCULATOR
Filed Oct. 16, 1944    8 Sheets-Sheet 3
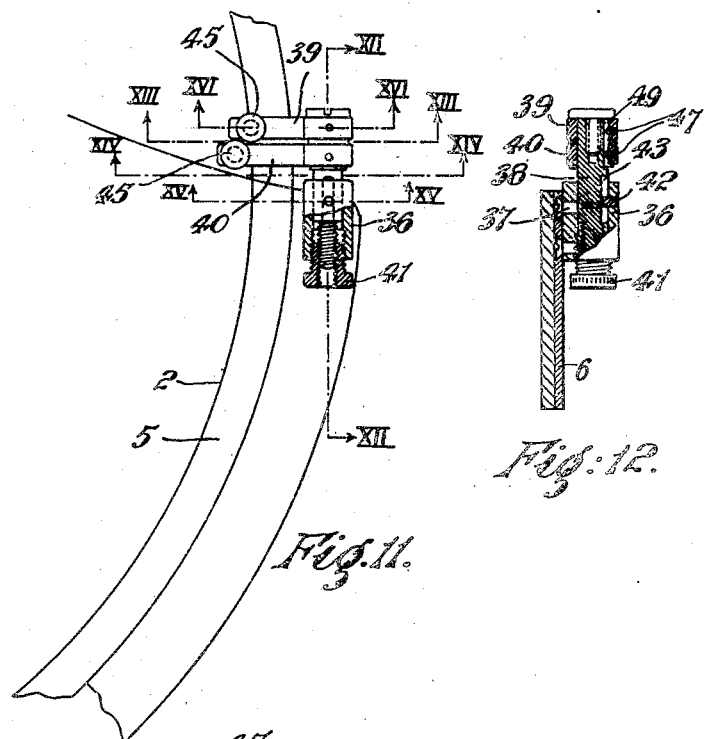
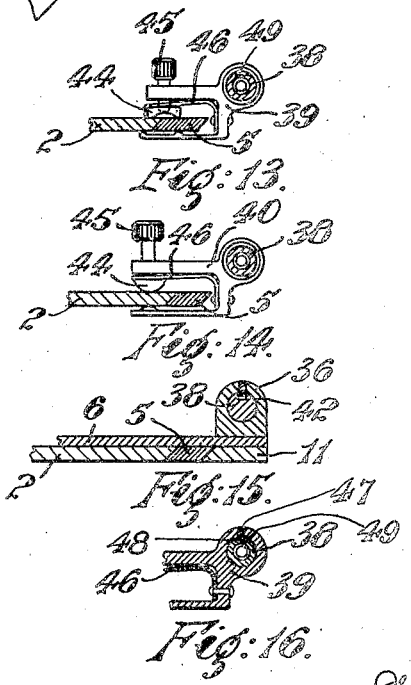
Inventor
George M. MacDonald
by Babcock & Babcock
Attorneys Aug. 26, 1947.        G. M. MacDONALD        2,426,362
              SLIDE RULE CALCULATOR
          Filed Oct. 16, 1944        8 Sheets-Sheet 4

Inventor:
George M. MacDonald
By Babcock & Babcock
Attorneys

Aug. 26, 1947.   G. M. MacDONALD   2,426,362
SLIDE RULE CALCULATOR
Filed Oct. 16, 1944   8 Sheets-Sheet 7

Inventor.
George M. MacDonald
By Babcock & Babcock
Attorneys

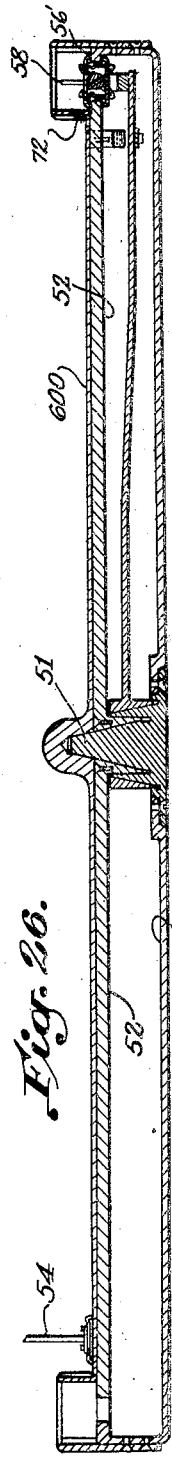
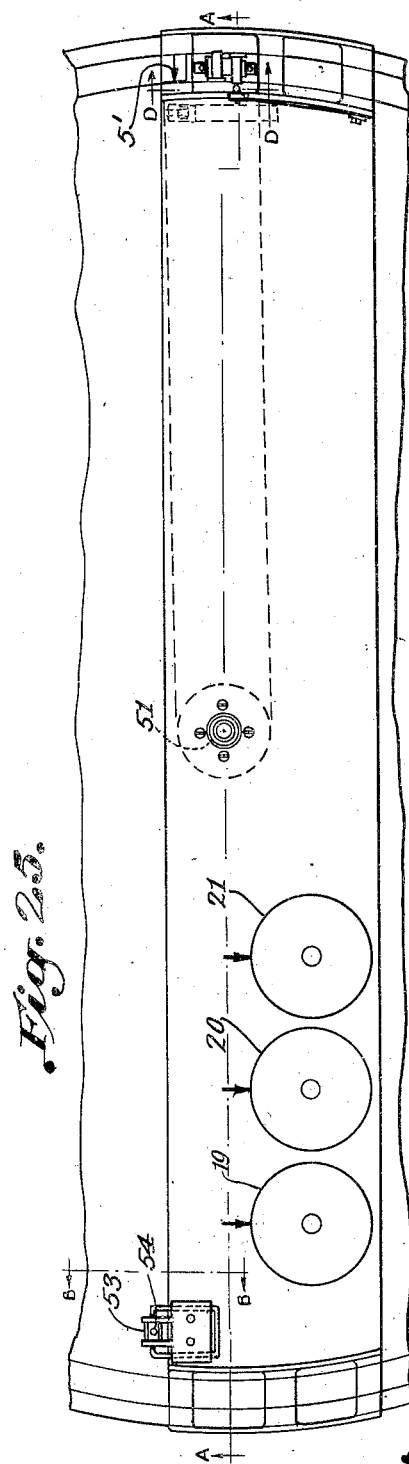
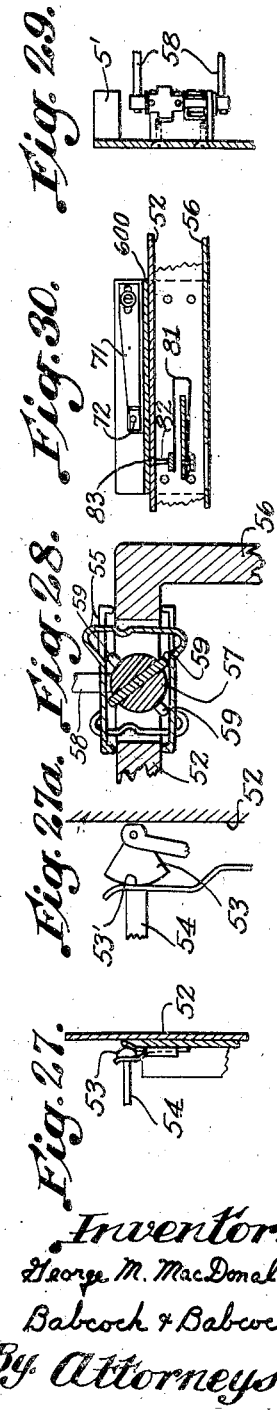

Patented Aug. 26, 1947

2,426,362

UNITED STATES PATENT OFFICE 2,426,362

SLIDE RULE CALCULATOR

George Marsden MacDonald, Coventry, England

Application October 16, 1944, Serial No. 558,851
In Great Britain October 26, 1943

4 Claims. (Cl. 235—84)

The object of this invention is to provide a mathematical instrument which, like the slide rule, automatically performs the functions of a table of logarithms. The principle involved is quite different from that of the slide rule, and the degree of accuracy is greater for any given length of scale. In slide rules, numerals are placed along a scale, and their logarithms are represented by their respective distances from the beginning of the scale at which point the numeral 1 is placed, since its logarithm is 0. Now this method of representing logarithms is attended by three serious drawbacks. Firstly, the divisions at the beginning of the scale are great, so causing a waste in scale length. Secondly, the divisions at the end of the scale are small, so causing a reduction in degree of accuracy near this point. Thirdly, the divisions are unequal, so preventing the use of a vernier scale to attain an increased degree of accuracy. These drawbacks are removed and great advantages added in the present invention, which depends for its operation upon a mathematical property of the well-known logarithmic spiral. The equiangular property of this spiral is already well-known, and is useful in the manufacturing process of this instrument. There is, however, another property which is even more useful. It is that the length of the spiral between any two points on the spiral is in constant proportion to the change in length of the radius vector between the same two points. This means that the radius vector which is one of the two polar co-ordinates of the spiral, can be replaced by the spiral itself. Thus, instead of placing equal divisions along the radius vector to represent numerals, we can place equal divisions along the spiral. This makes the scale of this co-ordinate very great, since the spiral may have a large number of coils. The other polar co-ordinate is the angle which the radius vector makes with a line passing radially through the origin of the spiral and herein referred to as the 'original line,' and its size is also dependent upon the number of coils. In this arrangement both the numbers and their logarithms are represented by equal divisions. The numbers are represented by equal divisions along the spiral, and the logarithms by equal angular divisions which the radius vector makes with the original line. The radius vector corresponding to any number is of course the line joining the origin (i. e., the point about which the radius vector rotates) to the graduation on the spiral for that number. Later it will be shown how logs may be automatically added, subtracted, multiplied or divided by an instrument which incorporates a graduated logarithmic spiral.

In the accompanying drawings,

Figure 11 is a fragmentary view in plan of a modification employing a micro or differential screw adjuster for the disc and index.

Figure 12 shows the same in axial plane section on line XII—XII of Figure 11.

Figure 13 is a cross-sectional view on the line XIII—XIII of Figure 11 illustrating the gripping device for the disc and index.

Figure 14 is a similar view on the line XIV—XIV of the same figure showing the gripping device for the disc only.

Figure 15 is another cross-sectional view of the screw adjuster on the line XV—XV of Figure 11.

Figure 16 is a detail cross-sectional view of the same on the line XVI—XVI of Figure 11.

Figures 17 to 21 inclusive are diagrams respectively designating and illustrating the successive steps in forming a vernier such as is embodied in the invention.

Figure 22:
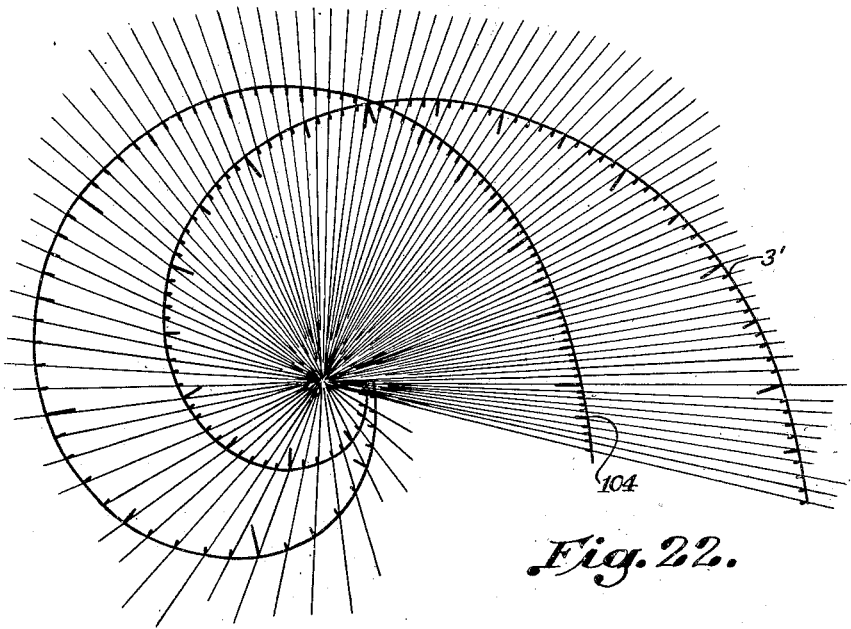

Figure 22 is a diagram demonstrating the impossibility of obtaining equigraduation with a form of spiral other than a logarithmic spiral such as used in the invention.

Figure 23:
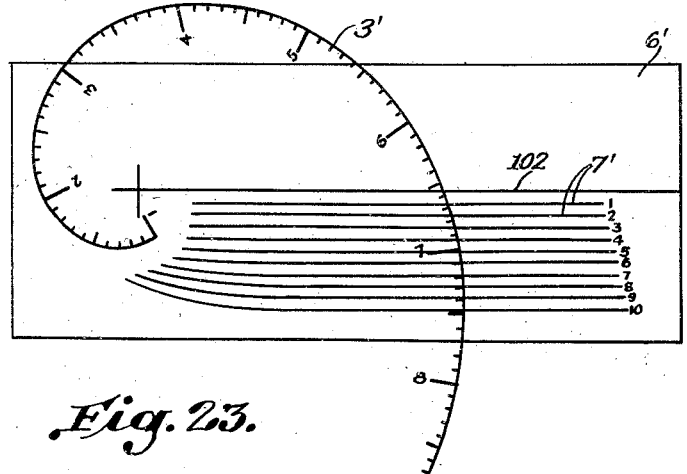

Figure 23 is a diagram illustrating the coaction between the vernier and the spiral in my invention.

Figure 24:
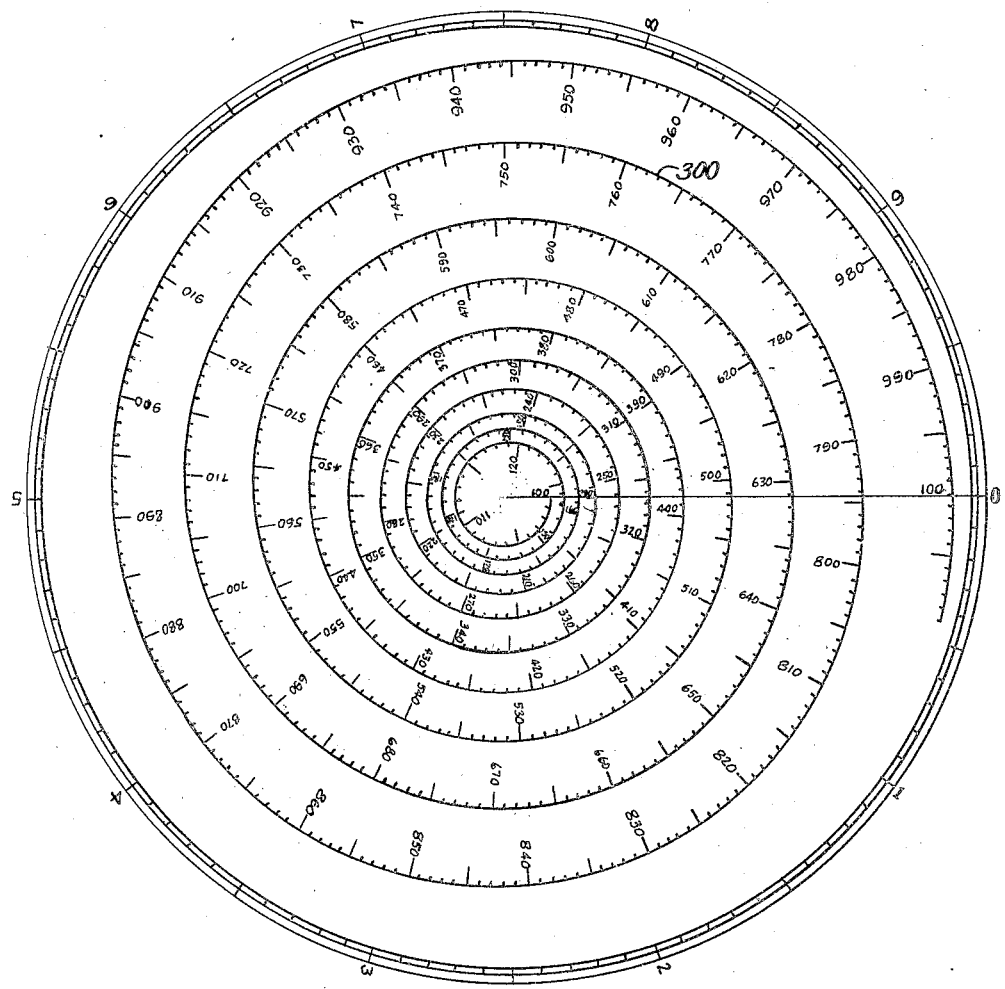

Figure 24 is a plan view of a coil formed according to the invention.

Figure 25 is a plan view, partly broken away, of a modified form of calculator using only one spiral vernier.

Figure 26 is a detail section on the line A—A of Figure 25, looking in the direction of the arrows.

Figure 27 is a detail sectional view on the line B—B of Figure 25, looking in the direction of the arrows.

Figure 27a is a view similar to Figure 27, but greatly enlarged.

Figure 28 is an enlarged fragmentary detail section on the line A—A of Figure 25, showing the construction of the locking connecting device.

Figure 29 is a detail section on the line D—D of Figure 25, looking in the direction of the arrows.

Figure 30 is a detail sectional view on the line C—C of Figure 26, looking in the direction of the arrows.

Throughout the drawings like parts are designated by similar reference characters.

Figure 1:
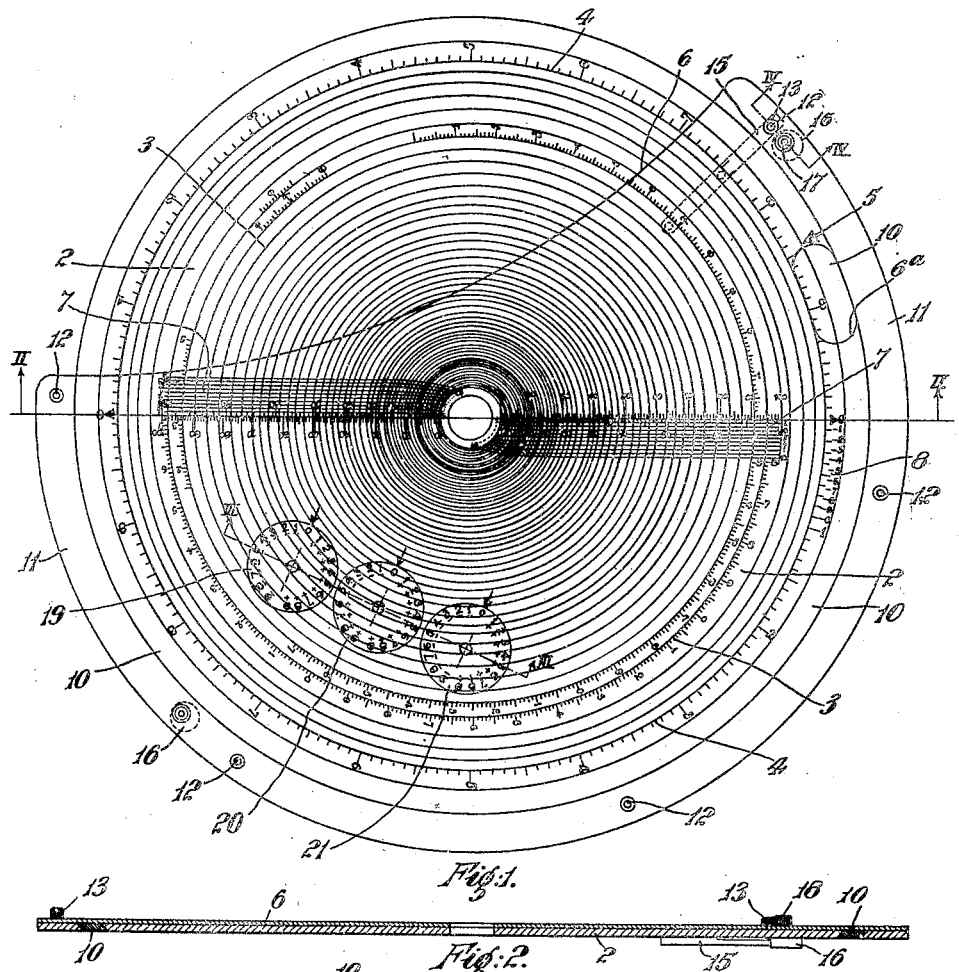
Figure 1 represents a plan or face view of the improved calculator.
Figure 2:
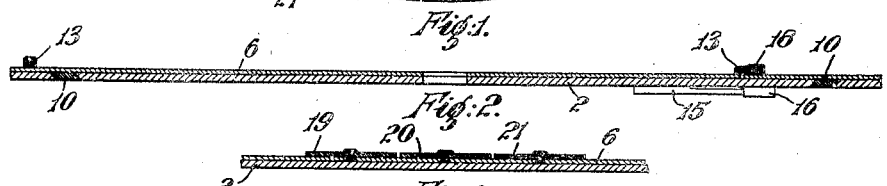
Figure 2 is a cross-sectional view of the same on the line II—II of Figure 1.
Figure 3:
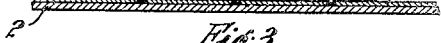
Figure 3 is a local cross-section on the line III—III of Figure 1 through the characteristic and mantissa dials.

In the form shown in Figure 1 the improved calculator is designed to read five figures and comprises three cooperating elements, viz: a flat disc 2 inscribed with a spiral 3 graduated in equal steps representing numbers and with a circular scale 4 surrounding said spiral concentrically with the origin thereof and graduated circumferentially in equal divisions representing logarithms, an index 5 movable relatively to said circular scale, and a sheet or element 6 of transparent material arranged over a part of said disc and engraved on the underside with two kinds of straight scale, hereinafter referred to, and with vernier lines 7 reading against the graduated spiral and referred to as the spiral vernier, and with a second vernier 8 reading against said circular scale, one of said vernier lines 7 being radial to the origin of the spiral at the centre of the disc 2. The disc and index are movable relatively to each other and to the transparent sheet 6 about the origin of said spiral. The said radial line is the number 0 spiral vernier line. The index, consisting of a fine line emphasized by an arrow head, is marked on a bevelled ring 10 arranged between the disc and a casing 11, and rotatable about the origin of the spiral. Thumb pressure is applied through the slot 6ª in the transparent sheet by the right hand which holds the instrument for clamping the index ring to the casing, and when it is desired to clamp the index ring 10 to the disc this is done by the fingers of the left hand which rotate the disc and index. Clamping to the casing is referred to as "locking" and clamping to the disc, as "connecting."

The transparent element 6 is correctly located with respect to the casing 11 by means of countersunk screws 12 and nuts 13 each having a conical washer 14 which is a close fit over the screw.

Associated with a fixed zero stop 15 attached to the underside of the disc is an adjustable zero stop comprising a disc 16 mounted eccentrically at the underside of the casing by means of a screw 17 and nut 18 and bearing against the fixed stop 15. A similar arrangement is provided at the diametrically opposite side of the disc.

The instrument carries three dials 19, 20 and 21 each of which is rotatable on the transparent element 6, relatively to a fixed pointer. Each dial is numbered 0 to plus 9 and 0 to minus 9, these numerals being spaced around the circumference of each dial. One (19) of these dials shows the characteristic of the logarithm and the other two are the first and second mantissa dials.

Figure 6:
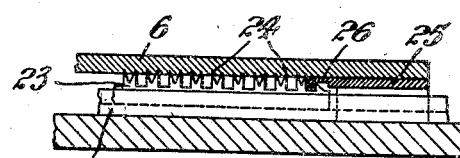
Figure 6 is a detail sectional view thereof.
Figure 7:
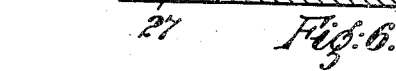
Figure 7 is a separate view of the comb.

The verniers on the transparent element may be regarded as composed of an infinite number of lengths of spiral of equal length placed with one of their ends on the original line and at a distance from the origin equal to that which they would normally occupy if they were distributed all round the origin at the various positions in which they would normally lie. These pieces are graduated in vernier steps, i. e., each step is equal to, say, $9/10$ or $19/20$ or $49/50$ of a scale step. Corresponding graduations are joined by lines which pass throughout the whole infinite series of spiral pieces. These are the vernier lines 7 and are quite easy to construct with accuracy. For this purpose a comb 23 consisting of a thin piece of flexible gauge steel is cut with teeth 24 in the manner shown in Figure 7. The distance between consecutive teeth is one vernier step and can be gauged either by a slip gauge or a gap gauge. No. 0 tooth is shorter than the others as it has to engage a groove 26 in a straight edge 25, as seen in Figure 6. This groove coincides with the hair line aforesaid and such coincidence is brought about by a method hereinafter described. The transparent element 6 which carries the vernier lines 7 is centred up with a disc 27 having a grooved spiral (not shown) by means of a precision peg 28. The back of the flexible gauge steel comb 23 engages the spiral groove at the outermost part of the spiral and the teeth 24 thereof engage the under face of the transparent element 6. The spirally grooved disc is then rotated and this sweeps the comb bodily inwards towards the origin, the rotation of the spiral being such as to maintain the comb in a state of light tension. As the comb sweeps along the teeth 24 scratch or cut the vernier lines 7 on the underside of the said transparent element. The accuracy of the vernier depends more upon the comb than the spiral although the latter can be made fairly accurate by pantographing from a wood master.

Figure 5:
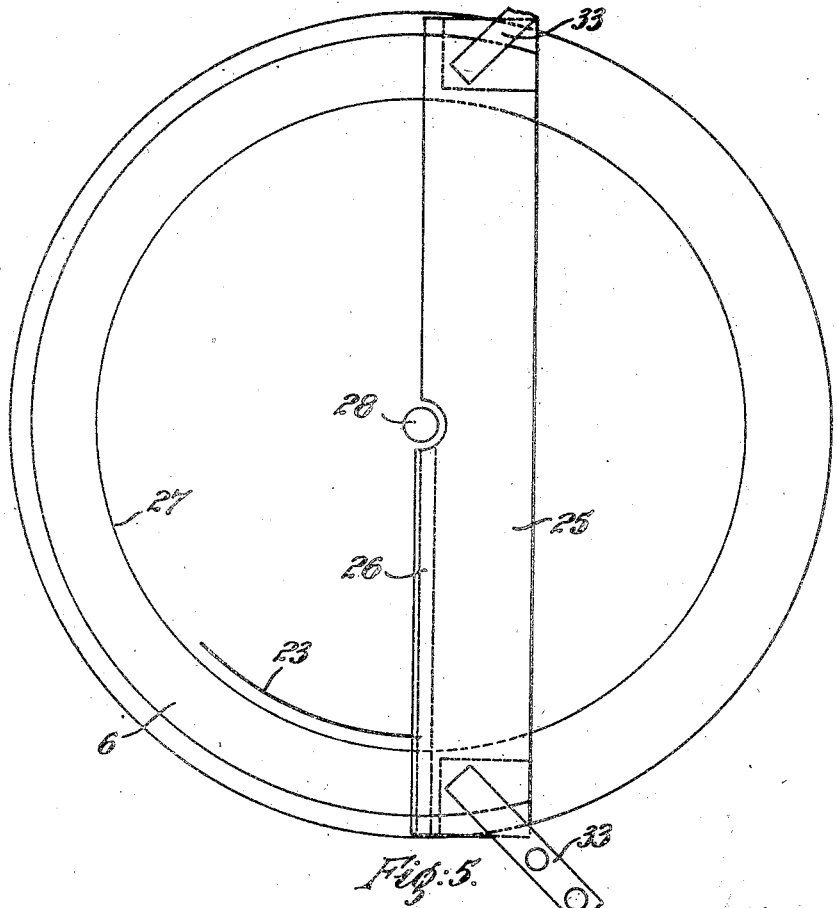
Figure 5 is a plan view of the apparatus employed for producing the vernier lines on the transparent material.
Figure 8:
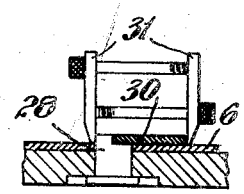
Figure 8 is a detail cross-sectional view through the centre peg in Figure 5.
Figure 10:
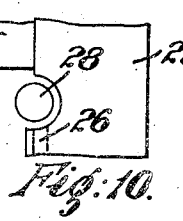
Figure 10 is a similar view of the grooved and second straight edges.
Figure 9:
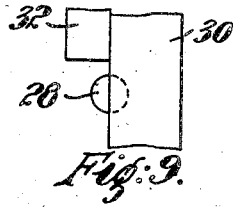
Figure 9 is a part plan view of the first and second straight edges.

The vertical wall of the groove in the grooved straight edge, see Figure 6, is made to coincide with the line along which the hair line will eventually be cut, by means of the precision peg 28. This peg fits tightly in the origin hole of the transparent element. A straight edge 30 is placed against the circumference of the peg 28 and clamped as shown in Figures 5 and 8 by clamps 31. A second straight edge 32 is placed against the first straight edge 30, as shown in Figure 9, and is clamped to the transparent element 6. The first straight edge is then removed and is replaced by the grooved straight edge 25, see Figure 10, which is clamped to the transparent element, as shown in Figure 5 by means of the clamping plates 33. The vertical wall of the groove in the grooved straight edge is then coincident with the line along which the hair line will eventually be cut. For this purpose a locating hole is reamed in the transparent material through a bush in the grooved straight edge. This locating hole is used both for cutting the hair line and for locating the circle vernier scale 8 which, as has been mentioned, is preferable on the transparent element 6 rather than on the index ring 5.

Figure 17:
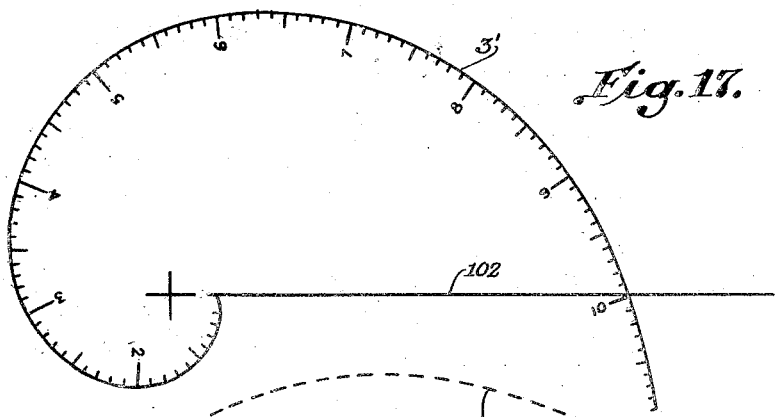
Figure 18:
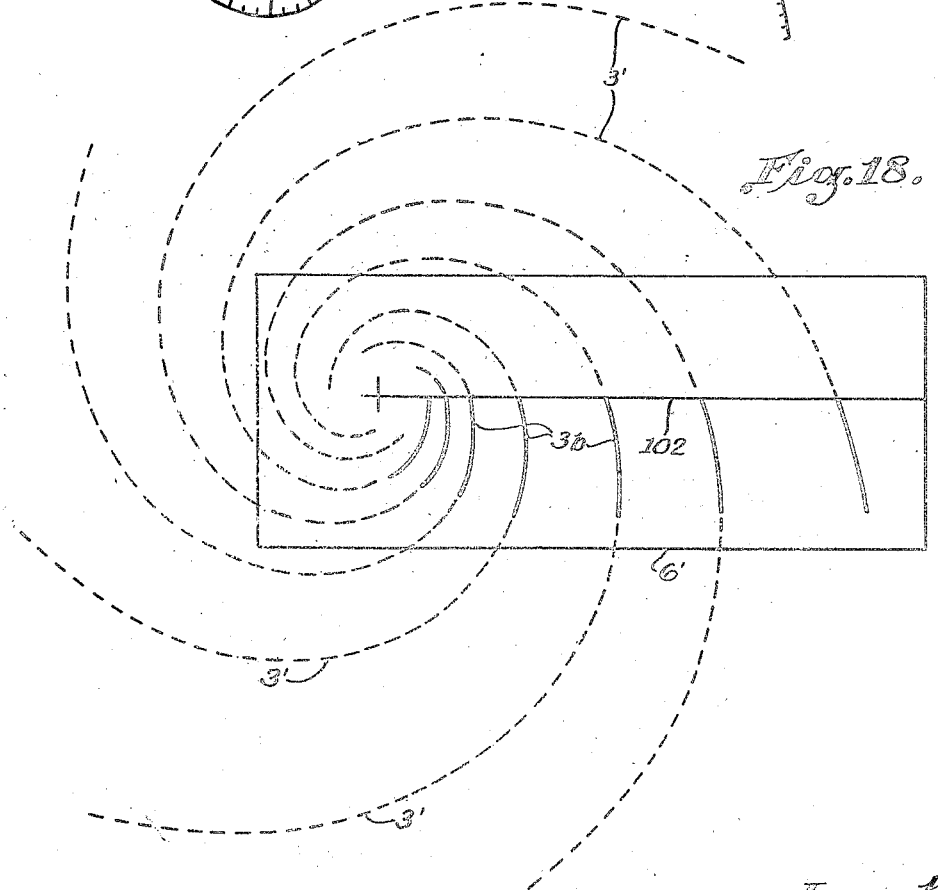
Figure 19:
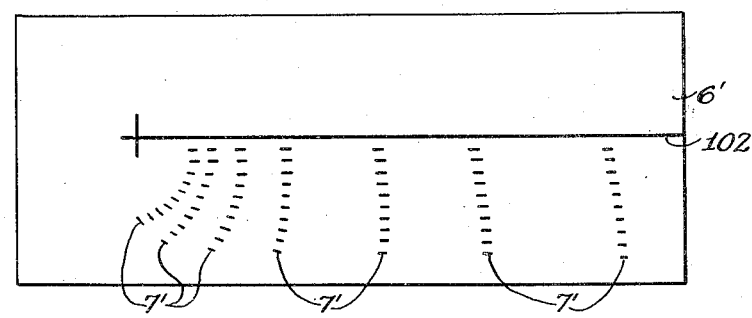
Figure 20:
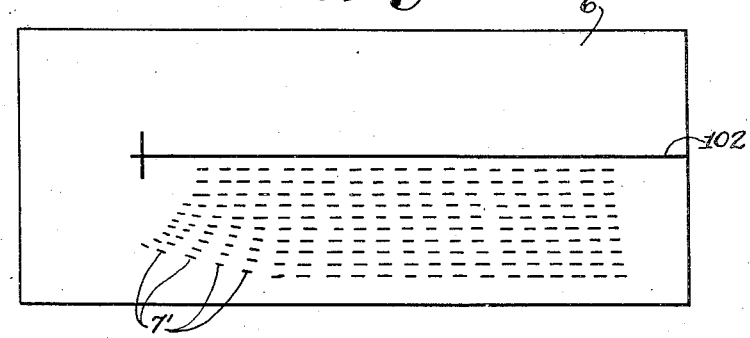
Figure 21:
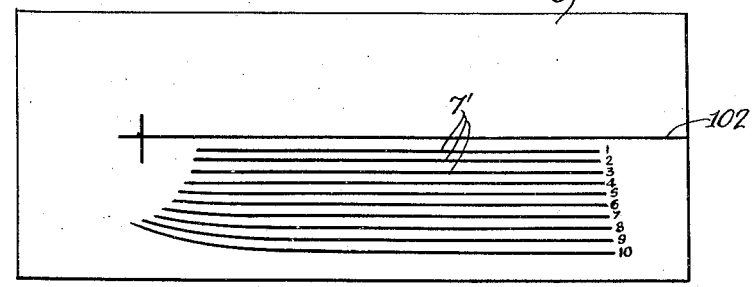

By way of elaboration of this method of forming the vernier, reference is made to Figure 17 which shows a one coil equigraduated spiral 3', and to Figure 18 which shows this spiral 3' with its origin or center of rotation placed under a hair line 102 which latter is on a sheet of, let us say, tracing paper 6'. This figure shows the spiral 3' rotated into various different positions under the sheet of transparent tracing paper 6', but with its center of rotation always under the same point under the hair line 102. Let it be supposed that in each position a short length of spiral 3b is traced onto the tracing paper 6'. This short length of spiral 3b commences at the hair line 102 and ends at a point which is equal in length to 9 spiral steps. All these pieces of spiral 3b are therefore equal to one another in length. They are not however the same as one another in shape since they are taken from different parts of the spiral 3'. Figure 19 shows these pieces of spiral 3b each graduated by indicia marks 7' into ten equal steps, the supposition being that a ten line vernier is being constructed. Figure 20 shows the result of having traced and graduated the spiral in quite a large number of different positions, and Figure 21 shows the same thing, the spiral supposedly having been traced and graduated in an infinite number of different positions. This causes the 10 graduating marks 7' on each piece of spiral to merge into those on either side of it, so forming 10 continuous lines. These are the vernier lines 1 to 10, number 0 being the hair line 102.

The diagram of Figure 22 demonstrates how equigraduation is destroyed when some form of spiral 104 other than the logarithmic spiral 3' is used. Figure 23 shows how the vernier 7' coacts with the spiral 3'. In this figure the hair line 102 indicates a number lying between 650 and 660. The actual reading is 657 because the 7th vernier line coincides with a spiral graduation.

The spiral 3 of the calculator should be extended as shown beyond the end of the last coil a distance of at least one vernier length so that the vernier 7 can be used right to the end of the last coil. The grooved spiral on the disc 27 should also be extended in the same way.

The theory and mode of use of the improved calculator will now be explained.

The logarithmic spiral is the graph of the polar equation $r = e^{a\theta}$ where $r$ is the polar co-ordinate called the radius vector, and $\theta$ is the other polar co-ordinate, and is the angle which the radius vector makes with the original line. The quantity $a$ is a constant which depends upon the relation between the increase in length of the spiral from one point to another, and the corresponding increase in length of the radius vector between the same two points. The constant $a$ also depends upon the base chosen for the logarithms. $e$ is the base of the Naperian logarithms. Now if $$r = e^{a\theta} \quad \text{(i)}$$

we get $dr/d\theta = a e^{a\theta}$, and substituting from (i) we get $$dr/d\theta = ar \quad \text{(ii)}$$

Suppose $dS$ represents an increment in the length of the spiral. We have that in any spiral (logarithmic or otherwise), $$dS = \sqrt{\{(r d\theta)^2 + (dr)^2\}}$$

From (ii) we get $r d\theta = dr/a$

Hence $$dS = \sqrt{\{(dr/a)^2 + (dr)^2\}}$$

Therefore $$dS/dr = \sqrt{\{(1/a)^2 + 1\}} \quad \text{(iii)}$$

Now $a$ is constant, so the spiral's length changes in constant proportion to the change in length of the radius vector. This is the property of the logarithmic spiral upon which the present invention depends.

Some formulae will now be given which are of basic importance. Suppose it is intended to use 10 as the base of the logarithms. Then if $r = e^{a\theta}$ we get $$\log_{10} r = a\theta \log_{10} e \quad \text{(iv)}$$

When $r$ is 10 we get $$1 = a\theta_1 \log_{10} e$$

Hence $$a = (\log_e 10)/\theta_1 \quad \text{(v)}$$

The value of $\theta_1$ will again be considered.
Now when $r = 1$, we get from (iv) that $$0 = a\theta_2 \log_{10} e$$

Hence $\theta_2$ must be equal to 0. So for our purposes we may suppose the angle co-ordinate to commence with the value 0 on the original line, the corresponding value of or length of the radius vector being unity whose log is of course 0. Now it is convenient to make $\theta_1$ equal to a multiple of $2\pi$ radians so that the radius vector again lies on the original line when its length is equal to 10 units. This is the condition of Equation v. We therefore make $\theta_1$ equal to $2\pi N$ radians where N is the number of complete coils we wish the spiral to have between the points corresponding to $r = 1$ and $r = 10$. Hence we get from (v) that $$a = (\log_e 10)/2\pi N \quad \text{(vi)}$$

Assuming the spiral path itself to begin where $r = 1$ unit and end where $r = 10$ units. This unit will be called $q$ and is the unit of length for the radius vector only. The spiral path is graduated in equal steps and the numeral 1 (with 0's following if desired) is placed at the very beginning of the spiral. At the end of the spiral the number 10 is placed with the same number of 0's following it as with the 1. The intervening space on the spiral is divided equally into 9, 90, 900, 9000 (and so on) spaces, depending upon the number of significant figures to which we want the spiral to read without the aid of a vernier. The total number of divisions or steps is one less than the total number of graduating marks, since each step is followed by a mark, while the first one is also preceded by one. Now the total number of steps is $9 \times 10^m$ where $m$ is whole number. If $n$ is the number of figures to which it is desired the spiral to read, then $n = (m+2)$. For example, if the spiral is divided into 9,000 steps, we can read to 4 figures without the aid of a vernier. The vernier, however, gives an additional figure, so making 5 significant figures.

Now $9000 = 9 \times 10^3$ and $3 + 2 = 5$ significant figures. This concludes the example.

If N is the number of coils and $q$ is the unit of radius vector length, we can obtain the total length of the spiral in terms of $q$ and N thereby finding the size of a step which in itself is a matter of first importance.

From (iii) we get $$dS/dr = (1/a)\sqrt{(a^2+1)}$$

$$S = \int_{r=q}^{r=10q} (1/a)\sqrt{(a^2+1)}\, dr$$

$$S = (9q/a)\sqrt{(a^2+1)}$$

Combining this with Equation vi we get $$S = 9q\sqrt{\{(2\pi N \log_{10} e)^2 + 1\}} \quad \text{(vii)}$$

Equation vii gives the increase in length of the spiral from the point where $r = q$ to the point where $r=10q$. Since the total number of steps is $9\times 10^m$ which equals $9\times 10^{n-2}$, and if $t$ is the length of a step we get that $t=S/(9\times 10^{n-2})$ which when combined with Equation vii gives us $$t=(q/10^{n-2})\sqrt{\{(2\pi N\log_{10}e)^2+1\}} \qquad \text{(viii)}$$

Here $t$ is the length of a portion of spiral, and is not a mere distance. If a type of vernier is used in which 9 scale steps are equal to 10 vernier steps, then we require the whole of the $9\times 10^{n-2}$ steps on the spiral. But if a vernier is used in which 19 scale steps equal 20 vernier steps, it is found that each of the 19 steps is equal to $2t$ instead of $t$, so that every other graduation can be eliminated. Thus, if $t$ was originally designed to be .005 inch, the $19/20$ vernier makes the distance (along the spiral path) between graduations become .010″ while still reading to the same degree of accuracy as before. Any other types of vernier may be used, e. g., a $24/25$ vernier eliminates 6 graduations out of every 10, and a $49/50$ vernier eliminates 8 out of every 10.

The graduations along the spiral are primarily for numbers, but its usefulness is greatly increased if other graduations are also inserted which indicate on the spiral the numerical values of useful constants such as functions of $\pi$ and tangents and sines of angles, e. g., a graduation for tan 36° 1′ may appear at a point intermediate between the graduations for the numbers 7265 and 7270. To avoid confusion, this graduation may be to one side of the numerical graduations and may be radially disposed instead of at right angles to the spiral path. This radial disposition is chiefly useful for constants since the hair line against which they are read is a radial line. The numerical graduations are preferably dots since the vernier lines against which they are read are not radially disposed.

The divisions for the angular co-ordinates are marked off around the circumference of a circle whose centre is the origin. This is the graduated circle. It is often convenient to divide its circumference in to 1000 parts. If a movable radial line is made to coincide with any quantity indicated on the spiral, the later figures of the logarithm of the quantity are indicated by the position of the radial line on the circumferential graduations. The reading can be made more accurate by the addition of a vernier to the movable radial line. The earlier figures of the logarithm are the number of the coil upon which the desired quantity is marked. For example, suppose a spiral of 10 coils is divided into 9000 steps. The first of these coils is designated coil No. 0. This is the coil nearest the origin. The 10th coil is No. 9. Now suppose it is desired to read off the logarithm of the number 31416. A radial hair line (which it is supposed is engraved together with vernier lines on the underside of a piece of transparent material) is placed between the graduations for the numbers 3141 and 3142 at a point such that the 6th vernier graduation coincides with a graduation on the spiral. Looking at the circumferential graduations, it is found that the radial hair line lies between the graduations for 971 and 972 at a point such that the 5th division on a circumferential venier (with which the hair line is also supplied) coincides with a circumferential graduation. Thus 9715 are the last 4 figures of the mantissa of the logarithm of the number 31416. The first figure of the mantissa is 4, and this is the number of the coil upon which the number 31416 is found.

To facilitate description, an actual case which has been designed will now be given. In this design, the spiral, which grows in the clockwise direction, has 50 coils. The unit of radius vector length (viz. $q$) is $5/12$ inch. The smallest radius vector is therefore $1/12$ inch and the largest is $50/12$ or $4\frac{1}{6}$ inches. The radius vector at the end of the first coil is greater than the one at its beginning by about .0196″. This amount is called the "minimum coil spacing." With this amount of coil spacing, numerals about .015″ wide and any height can be used. If graduations are in the form of dots, this leaves clearance between the numerals and the coils on either side of them at the most congested part of the disc. Numerals of this width are quite clear to the naked eye. The total number of steps in this design is $9\times 10^4$ which is 90,000. The instrument therefore reads to 6 figures with vernier aid. Each step is just over .005685 inch in length. 8 out of every 10 steps are, however, eliminated because a $49/50$ vernier is used. So the length of coil between graduations is just over .028425 inch. The original line is extended past the origin and so cuts all the coils in half. The first half coil is numbered 00 and the second 01, and so on to the last half coil which is numbered 99. The numbering of half coils instead of whole coils means that the coil fraction "F" referred to in my concurrent application aforesaid is ½, and the number of verniers required being 1/F is therefore two. The second vernier is adjacent the original line produced. It is needed because the disc never makes more than F revolutions which in this case is ½ revolution. Numbers whose logs have an even number for the first two mantissa digits will be readable on the vernier associated with the original line, while all other numbers will be readable on the vernier associated with the original line produced. The circumferential graduation coinciding with the original line is number 0, while that coinciding with the extension of the original line on the opposite side of the origin is number 1000. The total number of circumferential steps is 2000. The graduation following number 1000 is number 1, and the whole of the second 1000 steps are numbered as were the first 1000. Only one half of the circle graduations ever come near the circle vernier, but the other half are shown as they check the positions of the constants marked against them. A $49/50$ vernier is used and this eliminates 8 out of every 10 steps so the distance between graduations is about .07422″ the diameter of the circle being 9.45 inches. The circle vernier is engraved on the under face of the transparent material. The instrument carries three rotatable dials attached to the transparent material upon which latter three indicating arrows are also engraved. All the dials can indicate numerals from 9 to 0 to minus 9, these numerals being spaced around the circumferences of the three dials. These three dials are the characteristic dial, the first mantissa dial, and the second mantissa dial, respectively.

The instrument in the drawing has been made to read to 5 figures instead of 6 to make the drawing less cramped and therefore more clearly visible. This has been achieved by eliminating half the graduations on both spiral and graduated circle and substituting 10 line verniers for the 50 line verniers. Suppose it is desired to perform the following mathematical operation:

$(95.0364\times 7.51213\times .870162/6.01373)^{1.51532}$

Worked out by logs, the calculation appears as follows, giving the answer 1127.20.

$$1.977890 = \log. \ 95.0364$$
$$0.875763 = \log. \ 7.51213 \quad (+)$$
$$\overline{2.853653}$$
$$1.939600 = \log. \ \ .870162 \quad (+)$$
$$\overline{2.793253}$$
$$0.779144 = \log. \ 6.01373 \quad (-)$$
$$\overline{2.014109}$$
$$0.304083 = \log. \ 2.014109$$
$$0.180504 = \log. \ 1.51532 \quad (+)$$
$$\overline{0.484587 = \log. \ 3.05202}$$
$$\overline{3.05202 \ = \log. \ 1127.20}$$

Hence 1127.20 is the answer.

The above process is exactly analogous to the operations performed on the instrument, and should be followed step by step in conjunction with these operations, which will now be given in detail.

Figure 4:
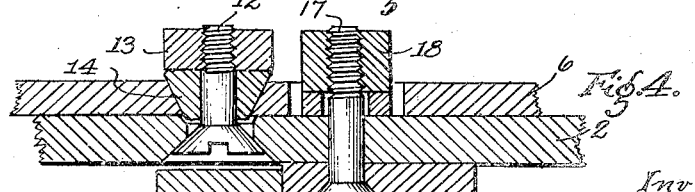
Figure 4 is an enlarged detail sectional view on the line IV—IV of Figure 1 of the fixed and adjustable stops.

The arrow on the index is brought into coincidence with the original line (not the original line produced) on the disc. This operation can be assisted by a weakly spring loaded plunger on the index engaging a V-notch on the disc or zero stop attached to the disc. It is unnecessary to withdraw the plunger to disengage, as engagement is took weak to resist much force. The disc is rotated in the anti-clockwise direction till the spiral graduations for 950350 and 950400 (.95030 and 95040 with a $\frac{9}{10}$ vernier) lie on either side of the hair line and the fourteenth vernier graduation (sixth for $\frac{9}{10}$ vernier) coincides with a spiral graduation. Very slight movement of the disc can be brought about by the differential screw adjuster hereinafter described. The fourteenth vernier graduation (sixth for $\frac{9}{10}$ vernier) having been made to coincide with a spiral graduation, the index is immediately locked. It is then noted that the half coil upon which the position for the number 950364 is to be found is half coil number 97. We therefore turn the first and second mantissa dials 20 and 21 to 9 and to 7 respectively. We also turn the characteristic dial 19 to 1, since this is the characteristic of 95.0364. The locked index is left where it is while the disc is rotated backwards till its original line coincides with the hair line. This operation is zeroing the disc and can also be facilitated by the adjustable zero stop 16, Figures 1 and 4. Now the index is connected and the disc again rotated in the anti-clockwise direction, so moving the index a stage further, and thereby effecting an automatic partial adding up of two logarithms. The rotation is continued till the graduations for 751200 and 751250 (75120 and 75130 for $\frac{9}{10}$) lie on either side of the hair line and the thirteenth vernier graduation (first for $\frac{9}{10}$) coincides with a spiral graduation. The index arrow will by now have crossed the extension of the hair line. That is, it will have completed one half circle of rotation. In respect of this it is necessary to add 1 to the second mantissa dial, which then reads 8 instead of 7 as previously. The half coil upon which the position of the number 751213 is to be found is half coil number 87. When we add the 7 to the 8 which is already on the second mantissa dial 21, it makes 15, so we record 5 on this dial and carry the 1, which together with the 8 of 87, makes 9 to add to the 9 which is already on the first mantissa dial 20. As this makes 18, we record the 8 and carry the 1 on to the characteristic dial, which then reads 2 instead of the 1 as previously. Again we lock the index, zero the disc, and connect the index. The whole process is repeated for the number 870162. In so doing, it is found that the index completes a further half circle of rotation. So again we add 1 to the second mantissa dial, which then reads 6 instead of 5. The number of the coil concerned is 93 which when added to the 86 already recorded on the mantissa dials produces 79 with 1 to carry on to the characteristic dial. This makes the characteristic dial read 3. Now the characteristic of .870162 is minus 1. This minus 1 is added to the 3 on the characteristic dial, so making 2. The next operation is division, and herein lies a difference in method. After locking the index, the disc is not immediately zeroed. It is instead, immediately moved to the required number which is 601373. From which it is clear that much disc zeroing is eliminated by performing multiplications and divisions alternately whenever possible. This number is found on half coil number 77. As we are dividing, we subtract this 77 from the 79 already recorded on the two mantissa dials. This leaves 02 on these dials. The index is now connected and the disc is zeroed by revolving it in the clockwise direction which is also the backwards direction. Thus the index is this time moved a stage backwards and this constitutes the automatic partial subtracting of a logarithm. The index arrow is seen to re-cross the hair line so that it now has only one half circle of rotation to its credit instead of the two it previously gained. In respect of this it is necessary to subtract 1 from the second mantissa dial which then reads 1 instead of 2. The disc having been zeroed, the index is locked. It is now required to raise to the power 1.51532. To do this it is necessary to read the logarithm off the instrument. The three dials read 201 and so the first part of the logarithm is 2.01. With the disc hair line coinciding with the index arrow and the index locked in the position where the last operation left it, we are able to read off the remaining four figures of the mantissa part of the logarithm. It is noted that the number 0 line on the circle vernier lies between the circumferential graduations for 4100 and 4150 (410 and 420 for $\frac{9}{10}$) and that the ninth vernier graduation (first for $\frac{9}{10}$) coincides with a circumferential graduation. The whole logarithm is therefore 2.014109. This logarithm is treated as a number which is to be multiplied by the number 1.51532. So we set all the dials to zero and making a fresh start, carry out this multiplication by methods as already described. When this is complete, it is found that the characteristic dial is at 0, the first mantissa dial is at 4, while the second mantissa dial is at 8. The index is left in the locked position about a quarter the way round the circle. The disc is now moved round till its original line coincides with the arrow on the index. As the mantissa dials record 48 we look at half coil number 48 and from the hair line and vernier we read 305202. As the characteristic dial reads 0, this number becomes 3.05202. This is the logarithm of the answer. We now set the three dials to read 305. Then we turn the disc till the circumferential graduations read 2020 against the hair line together with the circle vernier. Since 05 is recorded on the mantissa dials, we look at half coil number 05 and against the hair line and its vernier we read 112720. Since the characteristic dial records 3, this number becomes 1127.20 and is the required answer. It is of course only necessary to read logarithms off the instrument when the calculation involves powers.

When about to read the answer, it may be noted that one or both the mantissa dails show a negative digit. Before reading the answer this must be made positive in the following way. To make the second mantissa dial positive add 10 to it and subtract one from the first mantissa dial. To make the first mantissa dial positive, add one to it and subtract one from the characteristic dial which latter may of course remain negative.

Against the original lines the drawing shows a regular scale and a diverging scale. These are the numerical scale and the mantissa scale. The function of the latter is merely to indicate the half coil number or broadly the coil fraction number, and the graduation concerned is the nearest one inwards from the coil concerned, that is the coil bearing the number under consideration. The function of the regular scale is to eliminate some of the digits of the numbers arranged along the spiral. For example, if a half coil passes between graduations 21 and 22 the first two digits of all numbers on that half coil are 21. Equation iii explains why the graduations on this scale are regular.

The first spiral mentioned had 10 coils and 1000 circumferential steps while the next had 50 coils, and each half of the graduated circle was divided into 1000 steps. In the second case we noted that additions were made to, and deductions were made from the second mantissa dial in respect of each half revolution of the index. An instrument having the 10 coil spiral would have only one mantissa dial instead of two, and it would be added to or subtracted from as a result of whole and not half revolutions of the index. Other arrangements beside whole and half revolutions are possible.

Half revolutions with a five coil spiral make a suitable 4-figure graduated spiral calculator. Such an instrument with a $19/20$ vernier for its spiral graduations need have its graduated circle no more than one inch in diameter. Each half of the graduated circle is divided into 100 parts. With a $9/10$ vernier logarithms can be read with ease from the index vernier and graduated circle. The minimum coil spacing is about .020 inch, so allowing the use of .010 inch numerals. The instrument has a characteristic and only one mantissa dial. Their pointers are pivoted at the centre of the instrument, and the dial numerals are on half circles concentric with the graduated circle. This instrument can be worn on the wrist like a wrist watch.

When magnification is resorted to, the benefit is theoretically proportional to the square of the magnifying factor, because not only is the apparent length of the graduations increased, but so is the apparent coil spacing, so allowing the use of a larger number of coils. It is useful to know the size of the space between coils, because it may be desired to insert a number of additional graduations for important mathematical or engineering constants useful in calculation. If several of these constants come together at the same point it is necessary to know how many of these can be accommodated in the space available. After this space has been determined, in the event trigonometrical and other quantities are required the space needed for them need not compel an increased coil spacing and thereby an increased overall size, as we shall see from the following: If L is the log of a number A, the radial distance from the point on the spiral for the number A to the next coil outwards is given by the formula $$d = q\{\text{antilog } (L+1/N) - A\} \qquad \text{(ix)}$$

The quantity $d$ is the required distance, while $q$ and N possess their usual meanings. The characteristic of L is made equal to 0. $d$ shows us what space is available. Thus for example in the ten coil spiral 300 shown in Figure 24 suppose it is desired to know the radial distance from the number 650 to the next coil outwards. This distance may be ascertained merely by multiplying 6.50 by .10357 inch. The latter number is the minimum coil spacing and is the intercept on the hair line cut off between the beginning and end of the smallest and innermost coil. The figure .10357 is obtained by putting $q$ (the innermost radius vector) equal to .4 inch, and N (the total number of coils in the spiral) equal to 10, and L (the mantissa log of the first number on the spiral) equal to zero, and A (the first number on the spiral) equal to 1, and inserting these equivalents in Equation ix above. The product of 6.50 × .10357 is equal to about .6732 inch, which is the radial distance between the coils at the point considered. Suppose that the radial distance between consecutive coils at the point corresponding to the given number A is K times as great as the minimum coil spacing. (I. e., when $L=0$ and $A=1$ in Equation ix.) Then $$\{\text{antilog } (L+1/N) - A\}/\{\text{antilog } (0+1/N) - 1\} = K$$

$$K \times \text{antilog } (0+1/N) - K = \text{antilog } (L+1/N) - A$$

$$K \times \text{antilog antilog } (1/N) - K = \\ \text{antilog } \{(\log A) + \log (\text{antilog } 1/N)\} - A$$

$$K \times \{\text{antilog } (1/N) - 1\} = \\ \text{antilog } [\log \{AX \text{ antilog } 1/N\}] - A$$

$$K \times \{\text{antilog } (1/N) - 1\} = AX \text{ antilog } (1/N) - A$$

$$K\{\text{antilog } (1/N) - 1\} = A\{\text{antilog } (1/N) - 1\}$$

$$\text{Hence } K = A$$

It must be noted that the characteristic of L is 0 and therefore the decimal point follows the first significant figure of A. The above working shows that the coil spacing at a point on the spiral for the number A is merely A times as great as the minimum coil spacing, that is if we take it that the decimal point follows the first significant figure of the number A. With this knowledge it is a simple matter to run the eye down a trigonometrical table or other table of constants and know immediately what space is available for the numbers encountered. Trigonometrical quantities can be roughly divided into the three following groups:

1. Sin 45° to sin 90°.
2. Tan 5° 42.636′ to tan 45°.
3. Tan 0° 00.0′ to tan 5° 42.636′.

These groups overlap each other, but where they overlap, sufficient coil spacing is available for accommodating such overlapping. A good arrangement for trigonometrical quantities is to mark sines from 90° down to 45° as numericals on the spiral and tangents from 45° to 5° 42.636′ also as numericals on the spiral, the characteristic of all these quantities being the same, viz: $\overline{1}$. Below 5° 42.636′ the characteristic for tangents changes to $\overline{2}$ and these are best marked as logarithmic quantities adjacent the graduated circle, the necessary mantissa figures being given in brackets. These tangents should not be continued beyond the point where the characteristic changes to $\overline{3}$.

Tangents whose logs are over 2 can be given in tabular form on some part of the casing of the instrument. If an angle is not given in the above three groups, its complement is, so that we can at once obtain tangents and cotangents of all angles from 0° to 90°. Sines are given from 45° to 90° from which we get cosines from 0° to 45°. The remaining sines and cosines are obtained by multiplying the appropriate tangents and cosines together or the appropriate cotangents and sines together. Thus the entire trigonometrical range is cared for without increasing the coil spacing.

If an instrument is designed for, say 4 figures, we can at once obtain the size of an instrument for any other number of figures having the same coil spacing, the same distance between graduations and the same type of vernier. The rule is to multiply the size by 10 for every additional figure. This rule is only for obtaining a rough idea, exact dimensions being worked out in the proper way.

The transparent material tends to collect smuts under it and this eventually renders it unreadable. It should therefore be made removable (for cleaning) and accurately replaceable with relation to the casing. This is because the disc is accurately centralised in relation to the casing by reason of itself, the index ring and the casing all having bevel working edges which act like a conical bearing. The accurate replacing of the transparent element can be effected by conical headed screws and conical washers, the latter being a close fit over the former.

When the instrument is arranged to read six figures a micro or differential screw adjuster is preferably employed for the purpose of giving a fine adjustment to the disc and index. A device for this purpose is shown in detail in Figures 11 to 16 and comprises a tubular body member 36 rigidly secured by screws 37 to the transparent material, a non-rotatable spindle 38 slidably arranged therein, a pair of gripping devices 39, 40 carried by the protruding end of said spindle, and an adjusting sleeve 41 having internal and external screw threads of slightly different pitch engaging corresponding external and internal threads on the spindle 38 and in the body member 36 respectively. The spindle is prevented from turning by means of a peg 42 engaging a longitudinal groove 43 therein. One of the gripping devices is adapted to grip both the disc 2 and the index 5, while the other is adapted to grip the disc 2 only, each being provided with a spring mounted gripping member 44 actuated by a clamping screw 45. When it is desired to give a fine angular adjustment to the disc 2, the clamping screw 45 of the gripping device 39 is loosened and the clamping screw of gripper 40 tightened up to grip the disc. The adjusting sleeve 41 is then turned in one or the other direction depending upon whether the required adjustment is clockwise or anti-clockwise. This causes an axial movement of the spindle 38 tangential to the disc 2, thereby giving a microadjustment to the latter. If it is desired to adjust both disc and index together the clamping screw 45 of the gripping device 40 is loosened and the clamping screw of the gripping device 39 tightened up to grip both disc and index after which the adjusting sleeve 41 is turned to give the required fine angular adjustment to the disc and index. When either of the clamping screws 45 is loosened the gripping element swings downwardly about the axis of the spindle 38, this free movement being, however, limited by pins 47 carried by the gripping elements abutting against the shoulders 48 of recesses 49 in the spindle. The upper limb of each gripping element is raised clear of the disc or disc and index by a spring 46.

A high accuracy instrument reading to, say, seven figures as illustrated in Figs. 25 to 30 inclusive, is preferably made for laying on the table instead of holding in the hand, and its coil fraction is preferably one so that there is only one spiral vernier, a fact which removes the need to turn the instrument half around to read the other vernier. The conical bearings 51 instead of being at the edges should be at the centre so that they are perfectly free running. This allows of rapid rotation of the disc 52 to make up for the fact that its maximum rotation is greater than it is when the coil fraction is say ½. It also allows of the use of a microadjuster consisting of a roller 53 arranged to engage the disc 52 near its edge. The roller 53 is rotated through small amounts by a long handle 54 attached to it. The roller 53 is normally kept out of engagement with the disc 52 by reason of a small segment of its circumference having been cut away. This cut part 53' of the roller 53 is brought adjacent the disc to bring about disengagement. A locking connecting device more reliable than the hand is desirable for such an instrument. A most reliable type of locking connecting device is one which when changed over from the locking position to the connecting position, connects before it unlocks. Also when changed over the other way, it locks before its disconnects. This ensures that there is no motion during the change over, as this would result in error. A simple locking connecting device suitable for high accuracy instruments and achieving this end is as follows: Two U-shaped leaf springs 55 with internal grips at the ends of the limbs of the U's grip the edge of the disc 52 and the base 56 respectively. The part of the base 56 gripped is an annulus 56' in the same plane as and concentric with the disc 52. To do this gripping the mouths of the U's 55 face in opposite directions. Also they lie side by side except that one is displaced a little inwards while the other a little outwards to make possible the gripping of the disc 52 and the base 56 respectively. A shaft 57 passes between the two pairs of limbs 55 and is pivoted to the index 5' upon which the two U-springs 55 are also held. The shaft 57 carries a handle 58 and also two pins 59 which pass through its axis at right angles to it. The pins 59 are also at right angles to each other. One inclines over at 45° towards the centre of the disc, while the other inclines at 45° away from the centre. The pins 59 protrude from either side of the shaft a little way, but not quite enough to touch the insides of the limbs of the U's 55. Each U 55 has one of these pins within it. When the shaft 57 is in this position it is normal. When normal, the disc 52, the index 5', and the base 56 are all locked together. If the shaft 57 is turned through 45° one way or the other, one of the pins 59 becomes perpendicular to the plane of the disc 52, while the other lies flat. Hence the jaws of one U 55 are opened by reason of its pin 59 becoming perpendicularly disposed across them. The other U remains shut. This means that the index 5' is now clamped to only one member instead of two. Had the shaft 57 been turned through 45° in the opposite direction the index 5' would again have become clamped to only one member, and this time it would have been the other one. It is clear that when changing over from the "locking" position to the "connecting" position or vice versa, the three members which are the disc 52, the index 5', and the base 56 become locked together, and at no time is the index free from the other two simultaneously.

In Figure 30, the numeral 71 designates an adjustable spring catch carried by the transparent material 600 for automatically aligning the original line on the spiral disc 52 with the number 0 spiral vernier line on the underside of the transparent material 600, the catch carrying a pin 72 to be removably received in a notch in the disc 52. The numeral 81 designates an adjustable spring catch carried by the index arm and having a pin 82 for insertion into a notch or hole 83 in the disc 52 for automatically aligning the index 5' with the original line on the spiral disc 52.

Mechanical means for accurately generating, graduating and numbering logarithmic spirals for use on calculators are disclosed in my concurrent application aforesaid.

I claim:

1. An instrument for use in making mathematical calculations involving the use of the logarithmic system, comprising three co-operating elements, viz: a flat disc having inscribed thereon a spiral graduated in equal steps representing numbers and a circular scale surrounding said spiral concentrically with the origin thereof and graduated in equal divisions representing logarithms, an index movable relatively to and around said circular scale, and a sheet of transparent material arranged over a part of said disc and engraved with a hair line radial to the origin of said spiral, said disc and index being movable relatively to each other and to the sheet of transparent material about the origin of said spiral.

2. An instrument for use in making mathematical calculations involving the use of the logarithmic system, comprising three co-operating elements, viz: a flat disc having inscribed thereon a spiral graduated in equal steps representing numbers and a circular scale surrounding said spiral concentrically with the origin thereof and graduated in equal divisions representing logarithms, an index movable relatively to and around said circular scale, and a sheet of transparent material arranged over a part of said disc and engraved with a vernier reading against said circular scale and with a plurality of vernier lines reading against said spiral and extending between points on the inner coil of said spiral and a corresponding number of points on the outer coil thereof one of said vernier lines being radial to the origin of said spiral, said disc and index being rotatable about the origin of said spiral relatively to each other and to said sheet of transparent material.

3. An instrument for use in making mathematical calculations involving the use of the logarithmic system, comprising three co-operating elements, viz: a flat disc having inscribed thereon a spiral graduated in equal steps representing numbers and a circular scale surrounding said spiral concentrically with the origin thereof and graduated in equal divisions representing logarithms, an index movable relatively to and around said circular scale, and a sheet of transparent material arranged over a part of said disc and engraved with a hair line radial to the origin of said spiral, said disc and index being movable relatively to each other and to the sheet of transparent material about the origin of said spiral.

4. An instrument for use in making mathematical calculations involving the use of the logarithmic system, comprising three co-operating elements, viz: a flat disc having inscribed thereon a spiral graduated in equal steps representing numbers and a circular scale arranged concentric with the origin of said spiral and graduated in equal divisions representing logarithms, an annular index surrounding said circular scale, and a sheet of transparent material arranged over a part of said disc and index and engraved with vernier lines reading against the graduations of said spiral and with a vernier reading against said circular scale, one of said lines being radial to the origin thereof, said disc and index being rotatable about the origin of said spiral relatively to each other and to said sheet of transparent material.

GEORGE MARSDEN MacDONALD.

REFERENCES CITED

The following references are of record in the file of this patent:

UNITED STATES PATENTS

| Number | Name | Date |
|---|---|---|
| 486,070 | Andrews | Nov. 15, 1892 |
| 1,042,755 | Beckett | Oct. 29, 1912 |
| 1,436,282 | Nuckolls | Nov. 21, 1922 |
| 1,691,104 | Zollman | Nov. 13, 1928 |

FOREIGN PATENTS

| Number | Country | Date |
|---|---|---|
| 22,620 | Great Britain | 1908 |